United States Patent
Sethi et al.

(10) Patent No.: US 12,406,202 B2
(45) Date of Patent: Sep. 2, 2025

(54) PREDICTING COMPONENT LIFESPAN INFORMATION BY PROCESSING USER INSTALL BASE DATA AND ENVIRONMENT-RELATED DATA USING MACHINE LEARNING TECHNIQUES

(71) Applicant: Dell Products L.P., Round Rock, TX (US)

(72) Inventors: Parminder Singh Sethi, Punjab (IN); Madhuri Dwarakanath, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 1056 days.

(21) Appl. No.: 17/137,670

(22) Filed: Dec. 30, 2020

(65) Prior Publication Data

US 2022/0207415 A1 Jun. 30, 2022

(51) Int. Cl.
*G06F 18/23* (2023.01)
*G06N 20/00* (2019.01)

(52) U.S. Cl.
CPC ............. *G06N 20/00* (2019.01); *G06F 18/23* (2023.01)

(58) Field of Classification Search
CPC ................................. G06N 20/00; G06F 18/23
See application file for complete search history.

(56) References Cited

U.S. PATENT DOCUMENTS 10,404,547 B2    9/2019  Bartfai-Walcott et al.
2020/0042933 A1*  2/2020  Jurich, Jr. .......... G06Q 10/0832

OTHER PUBLICATIONS

Ganguly, S., et al, A Practical Approach to Hard Disk Failure Prediction in Cloud Platforms, [received May 4, 2024]. Retrieved from Internet: <https://ieeexplore.ieee.org/abstract/document/7474362> (Year: 2016).*

Pinheiro, E., et al, Failure Trends in a Large Disk Drive Population, [received May 4, 2024]. Retrieved from Internet:<chrome-extension://efaidnbmnnnibpcajpcglclefindmkaj/https://www.usenix.org/legacy/events/fast07/tech/full_papers/pinheiro/pinheiro_old.pdf> (Year: 2007).*

(Continued)

*Primary Examiner* — Kevin W Figueroa
*Assistant Examiner* — Bart I Rylander
(74) *Attorney, Agent, or Firm* — Ryan, Mason & Lewis, LLP

(57) ABSTRACT

Methods, apparatus, and processor-readable storage media for predicting component lifespan information by processing user install base data and environment-related data using machine learning techniques are provided herein. An example computer-implemented method includes obtaining install base data associated with at least one system component and environment-related data associated with usage of the at least one system component; performing feature analysis on at least a portion of the obtained data using a first set of machine learning techniques; clustering, based on the feature analysis, at least a portion of the install base data and at least a portion of the environment-related data into one or more groups using a second set of machine learning techniques; generating at least one lifespan information prediction attributed to the at least one system component based on the clustering; and performing at least one automated action based on the at least one lifespan information prediction.

20 Claims, 5 Drawing Sheets

(56) References Cited

OTHER PUBLICATIONS

Kohli, M., Predicting equipment failure on SAP ERP Application using Machine Learning Algorithms, [received May 4, 2024]. Retrieved from Internet:<chrome-extension://efaidnbmnn-nibpcajpcglclefindmkaj/https://valiancesolutions.com/wp-content/uploads/2021/01/IEEE_Equipment-Reliability.pdf> (Year: 2018).*

Gokhroo, M., et al, Detecting and Mitigating Faults in Cloud Computing Environment, [received May 4, 2024]. Retrieved from Internet:<https://ieeexplore.ieee.org/abstract/document/7977362> (Year: 2017).*

Schroeder, B., et al, Understanding Disk Failure Rates: What Does an MTTF of 1,000,000 Hours Mean to You?, [received May 4, 2024] Retrieved from Internet: <https://dl.acm.org/doi/abs/10.1145/1288783.1288785> (Year: 2007).*

Iliadis, I., et al., Reliability of Geo-Replicated Cloud Storage Systems, [received May 4, 2024]. Retrieved from Internet: <https://ieeexplore.ieee.org/abstract/document/6974786> (Year: 2014).*

Mishra, S., et al, Remaining Life Prediction of Electronic Products Using Life Consumption Monitoring Approach, [received May 4, 2024]. Retrieved from Internet:<chrome-extension://efaidnbmnn-nibpcajpcglclefindmkaj/https://d1wqtxts1xzle7.cloudfront.net/66780097/02_S.Mishra_remngLifePredictionElecProdcts_> (Year: 2002).*

Murray, J., et al, Machine Learning Methods for Predicting Failures in Hard Drives: A Multiple-Instance Application, [received Apr. 2024]. Retrieved from Internet:<chrome-extension://efaidnbmnn-nibpcajpcglclefindmkaj/https://www.jmlr.org/papers/volume6/murray05a/murray05a.pdf> (Year: 2005).*

Nguyen, T., et al, Analysing the driving load on electric vehicles using unsupervised segmentation models as enabler to determine the time of battery replacement and assess driving mileage, [received Aug. 28, 2024]. Retrieved from Internet:<https://ieeexplore.ieee.org/abstract/document/8362381> (Year: 2018).*

Botezatu, M., et al, Predicting Disk Replacement towards Reliable Data Centers, [received Aug. 28, 2024]. Retrieved from Internet:<https://dl.acm.org/doi/abs/10.1145/2939672.2939699> (Year: 2016).*

* cited by examiner

PREDICTING COMPONENT LIFESPAN INFORMATION BY PROCESSING USER INSTALL BASE DATA AND ENVIRONMENT-RELATED DATA USING MACHINE LEARNING TECHNIQUES

FIELD

The field relates generally to information processing systems, and more particularly to techniques for component management using such systems.

BACKGROUND

Many business and other enterprise decisions are commonly dependent on the lifespan of various device and/or system components. However, conventional component management techniques typically rely on average lifespan information generated by manufacturers of the components, wherein such information is based primarily on component behavior in a fixed testing environment. Such information often fails to capture user-specific variables and environment-related features which can have non-trivial effects on component lifespans. As such, the average lifespan information generally stated by manufacturers might not be valid for all components across all users and/or environments, which can result in loss of resources for users.

SUMMARY

Illustrative embodiments of the disclosure provide techniques for predicting component lifespan information by processing user install base data and environment-related data using machine learning techniques. An exemplary computer-implemented method includes obtaining install base data associated with at least one system component and environment-related data associated with usage of the at least one system component. The method also includes performing feature analysis on at least a portion of the install base data and at least a portion of the environment-related data using at least a first set of one or more machine learning techniques, and clustering, based at least in part on the feature analysis, at least a portion of the install base data and at least a portion of the environment-related data into one or more groups using at least a second set of one or more machine learning techniques. Additionally, the method includes generating at least one lifespan information prediction attributed to the at least one system component based at least in part on the clustering, and performing at least one automated action based at least in part on the at least one lifespan information prediction.

Illustrative embodiments can provide significant advantages relative to conventional component management techniques. For example, problems associated with non-specific manufacturer-based average component lifespan information are overcome in one or more embodiments through automatically predicting component lifespan information by processing user install base data and environment-related data using machine learning techniques.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
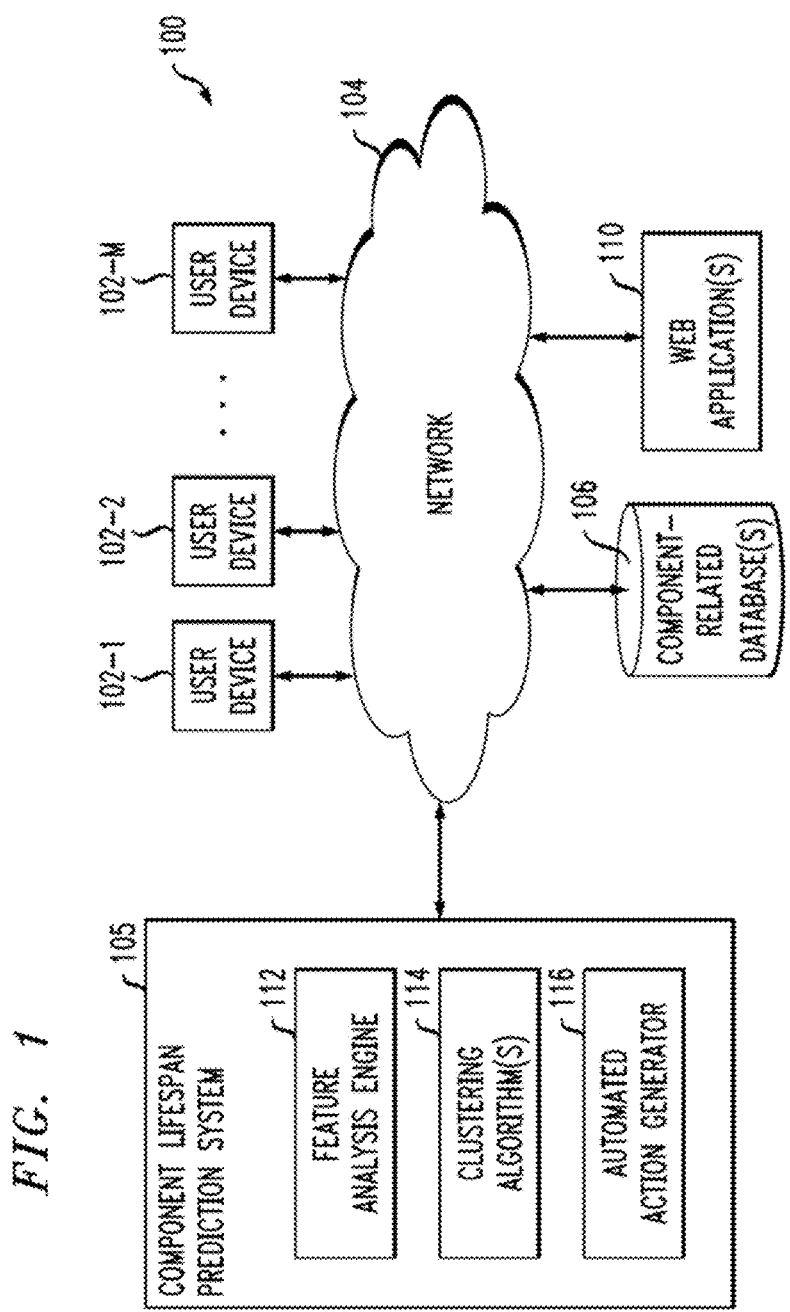
FIG. 1 shows an information processing system configured for predicting component lifespan information by processing user install base data and environment-related data using machine learning techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is component lifespan prediction system 105 and one or more web applications 110 (e.g., component management applications, component maintenance applications, component purchasing applications, etc.).

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, component lifespan prediction system 105 can have an associated database 106 configured to store data pertaining to component information, which comprise, for example, workload information, component environment-related information, component manufacturing-related information, etc.

The database 106 in the present embodiment is implemented using one or more storage systems associated with component lifespan prediction system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with component lifespan prediction system 105 can be one or more input-output devices, which illustratively comprise keyboards, displays or other types of input-output devices in any combination. Such input-output devices can be used, for example, to support one or more user interfaces to component lifespan prediction system 105, as well as to support communication between component lifespan prediction system 105 and other related systems and devices not explicitly shown.

Additionally, component lifespan prediction system 105 in the FIG. 1 embodiment is assumed to be implemented using at least one processing device. Each such processing device generally comprises at least one processor and an associated memory, and implements one or more functional modules for controlling certain features of component lifespan prediction system 105.

More particularly, component lifespan prediction system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows component lifespan prediction system 105 to communicate over the network 104 with the user devices 102, and illustratively comprises one or more conventional transceivers.

The component lifespan prediction system 105 further comprises a feature analysis engine 112, clustering algorithm(s) 114, and an automated action generator 116.

It is to be appreciated that this particular arrangement of modules 112, 114 and 116 illustrated in component lifespan prediction system 105 of the FIG. 1 embodiment is presented by way of example only, and alternative arrangements can be used in other embodiments. For example, the functionality associated with modules 112, 114 and 116 in other embodiments can be combined into a single module, or separated across a larger number of modules. As another example, multiple distinct processors can be used to implement different ones of modules 112, 114 and 116 or portions thereof.

At least portions of modules 112, 114 and 116 may be implemented at least in part in the form of software that is stored in memory and executed by a processor.

It is to be understood that the particular set of elements shown in FIG. 1 for predicting component lifespan information by processing user install base data and environment-related data using machine learning techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, two or more of component lifespan prediction system 105, component-related database(s) 106, and web application(s) 110 can be on and/or part of the same processing platform.

An exemplary process utilizing modules 112, 114 and 116 of an example component lifespan prediction system 105 in computer network 100 will be described in more detail with reference to the flow diagram of FIG. 4.

Accordingly, at least one embodiment includes predicting component lifespan information by processing user install base data and environment-related data using machine learning techniques. As further detailed herein, such an embodiment includes analyzing component behavior in a given user's environment, and based at least in part on such analysis, predicting lifespan information of a component as well as predicting future demand of the component, which can include, for example, displaying a forecast of how many components might be needed for a given future timeline. Additionally or alternatively, one or more embodiments include a first phase directed to collecting user install base details and use-based environment-related information, and a second phase directed to feature extraction and clustering and/or classification.

Accordingly, at least one embodiment includes obtaining information pertaining to a component user's install base and environment-based factors related to usage of the component (e.g., user datacenter environment-related information). In such an embodiment, this can include, for example, obtaining information (e.g., telemetry information) directed to workload on the component, one or more component usage statistics, one or more threshold usage values of the component that failed, the geographical region of a user's environment, the manufacturing batch (also referred to herein as the "slot") of the component, average component lifespan information (e.g., manufacture-generated lifespan information), etc.

With respect to workload information, the workload on each component in a given device can encompass and/or generate information including input and output operations taking place on and/or from the component. In connection with threshold values of a component that failed, one or more embodiments can include collecting failure-related logs and deriving, from at least portions of such logs, one or more threshold values. Such threshold values, by way merely of example, can include workload parameters on a given component for a hard disk drive (HDD), amount of time before one or more HDD requests will fail, how many incoming requests a process can handle before the process fails or performance is degraded, etc. Using this information, such an embodiment can also include deriving one or more threshold values for components in a specific environment.

As also noted above, one or more embodiments include collecting geographic information pertaining to the user's environment which can include, for example, the region, city, etc. Such information can be collected, for instance, in connection with registration information that is entered by the user and/or in connection with installation or deployment operations. With respect to manufacturing batch information, it is to be appreciated that there are typically X number of components that are manufactured in a single batch, and it is assumed that because certain components are manufactured in the same batch, such components are likely to behave similarly.

As also noted above and further detailed herein, at least one embodiment additionally includes feature analysis and/or extraction, as well as data clustering using at least one clustering and/or classification engine. In such an embodiment, unsupervised data obtained and/or generated as noted above (e.g., in the first phase of the solution) are processed using one or more clustering algorithms and/or mechanisms.

Figure 2:
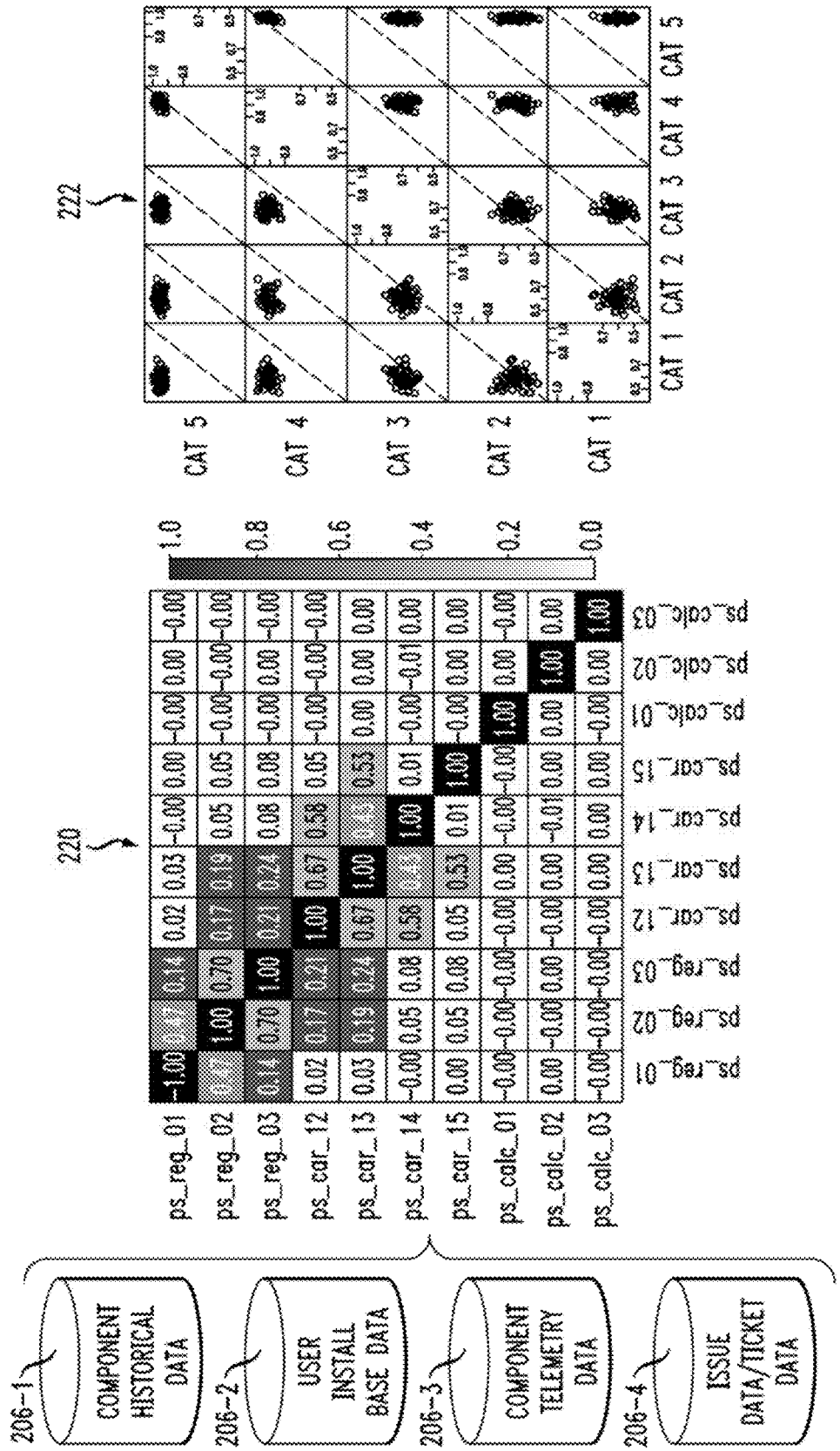
FIG. 2 shows feature analysis in an illustrative embodiment.

FIG. 2 shows feature analysis in an illustrative embodiment. By way of example, FIG. 2 depicts database 206-1 which stores component historical data, database 206-2 which stores user install base data, database 206-3 which stores component telemetry data, and database 206-4 which stores issue data and/or ticket data. Additionally, FIG. 2 depicts example feature co-relation representations 220 and 222, which are generated by processing input data such as data derived from database 206-1, 206-2, 206-3 and/or 206-4, and which illustrate how at least one feature is co-related to one or more other features, or, in other words, how much impact at least one feature has on one or more other features. In the FIG. 2 example, in co-relation representations 220 and 222, darker colors indicate stronger co-relation.

In connection with component historical data, one or more embodiments include collecting data pertaining to how specific components behaved historically for different users. Also, for example, such data can be collated for users having system components that are manufactured in the same batch. With respect to user install base data, at least one embodiment includes collecting information such as the geographic region in which a datacenter is located, workload on one or more components, manufacturing batch of the component(s), etc. In connection with component telemetry data, one or more embodiments include collecting telemetry information for one or more devices related to the component(s) in question. Also, with respect to issue data and/or ticket data, at least one embodiment includes extracting issue and/or ticket information related to one or more relevant devices and components related thereto from at least one backend system.

In one or more embodiments, example telemetry data can include data pertaining to hardware inventory (e.g., components present in a device such as a fan, an HDD, etc.), data pertaining to software inventory (e.g., which softwares are installed, their installed versions, the path at which each software is installed, etc.), and/or data pertaining to health and current state (e.g., for each hardware and software component, an example embodiment can include collecting health information, component count(s), unique identifier of one or more components, and information related to whether them are factors associated with a given component (such as, for example, speed of a fan, size of an HDD, available HDD capacity, etc.)).

As illustrated, for example, in FIG. 2, one or more embodiments include performing feature analysis and feature tagging on different datasets (e.g., datasets from databases 206-1, 206-2, 206-3 and 206-4). More specifically, in such an embodiment, using one or more correlation analysis and feature interaction techniques, one or more features are identified (e.g., as illustrated via feature co-relation representations 220 and 222) from the datasets and at least a portion of the identified features are subsequently used for clustering. By way of example, such an embodiment can include using one or more correlation coefficient algorithms (e.g., Pearson correlation coefficient) to define the co-relation between two or more different parameters (e.g., via co-relation values ranging from −1 to +1).

Figure 3:
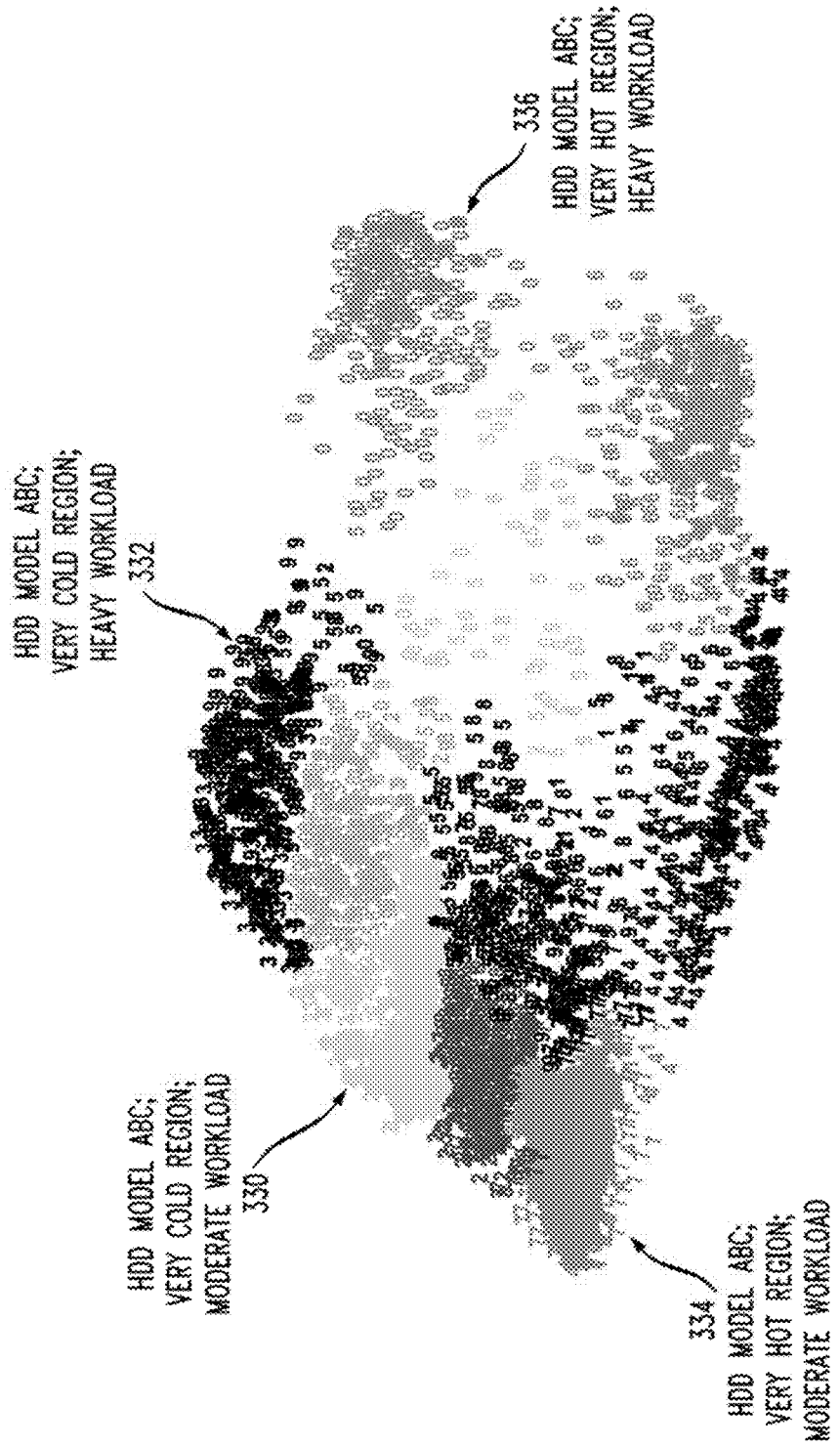
FIG. 3 shows example clustering results in an illustrative embodiment.

FIG. 3 shows example clustering results in an illustrative embodiment. By way of example, FIG. 3 depicts an example clustering image pertaining to an HDD component of a particular model (i.e., model ABC) in different conditions such as region and workload. Specifically, the FIG. 3 example shows cluster 330, which represents HDD model ABC working in a very cold region with a moderate workload, cluster 332, which represents HDD model ABC working in a very cold region with a heavy workload, cluster 334, which represents HDD model ABC working in a very hot region with a moderate workload, and cluster 336, which represents HDD model ABC working in a very hot region with a heavy workload.

As noted herein and in part detailed in connection with FIG. 3, one or more embodiments include using clustering techniques (e.g., one or more machine learning-based database clustering techniques) for discovering patterns and structures in unlabeled feature datasets. Such an embodiment can include, for example, clustering components that exhibit similar behavior in light of environment-related information, temperature-related information, workload-related information, etc.

By way of example, at least one embodiment can include implementing density-based spatial clustering of applications with noise (DBSCAN), a machine learning-based density-based clustering algorithm that identifies groups or clusters in data by using unsupervised learning methods. Such a DBSCAN algorithm can process input data (such as described herein, for example) and discover clusters of different shapes and sizes, even in scenarios wherein the input data encompass large amounts of data that contain noise and/or outliers.

Additionally, such an algorithm derives reachability and density connectivity by using parameters such as minPts and eps ($\varepsilon$), wherein minPts represents the minimum number of points (a threshold value) clustered together for a region to be considered dense, and wherein eps ($\varepsilon$) represents a distance measure that is used to locate the points in the neighborhood of any point. Also, as used above and further herein, reachability refers to a point that is established and has to be reachable from another point if the points lie within a particular distance (eps), while connectivity refers to a transitivity-based chaining-approach to determine whether points are located in a particular cluster.

Also, in one or more embodiments, after a DBSCAN clustering is carried out, multiple types of points can exist and/or be identified, such as, for example, core points, border points, and noise points. In such an embodiment, a core point refers to a point that has at least n points within distance n from itself, a border point refers to a point that has at least one core point at a distance n, and a noise point refers to a point that is neither a core point nor a border point, and has less than m points within distance n from itself.

Further, in at least one embodiment, algorithmic steps for carrying out DBSCAN clustering can include, for example, the following. For instance, the DBSCAN clustering algorithm randomly identifies a hard drive from a given dataset (until all points have been visited). If there are at least "minPoint" points within a radius of "ε" to a given point, then all such points are considered to be part of the same cluster. Each cluster is then expanded by recursively repeating the neighborhood calculation for every neighboring point.

Accordingly, at least one embodiment includes automatically predicting how a given component will behave in connection with a specific environment, temperature, workload, etc., and using such a prediction to further predict lifespan information for the given component. In such an embodiment (such as detailed above and herein), clustering techniques generate one or more clusters of devices and/or components exhibiting similar behaviors (e.g., end-of-life timing and/or behaviors). Accordingly, one or more embodiments include determining that a given device and/or component falls into and/or belongs in a specific cluster, determining the average end-of-life value for devices and/or components in that cluster, and subsequently basing an end-of-life prediction for the given device and/or component at least in part on the determined average end-of-life value for that cluster.

By way merely of example, assume a use case involving two HDDs manufactured in the same batch, wherein one of the HDDs is dispatched to India for use with a moderate workload while the second HDD is dispatched to Canada for use with a heavy workload. The HDDs are likely to behave differently due to variable factors (e.g., region, workload, etc.), and therefore their respective lifespans are also likely to be different (despite the fact that the manufacturer-stated "average lifespan" will be the same for both HDDs). As such, implementation of one or more embodiments can result in a more use-specific and accurate lifespan prediction for each HDDs, and based at least in part on such predictions, additional actions and/or decisions can be carried out with more efficient and cost-effective results.

As detailed herein, one or more embodiments include predicting lifespan information (e.g., end of life information) for a given component by processing data pertaining the corresponding user's install base and environment using machine learning techniques. Based at least in part on such a prediction, such an embodiment can also include determining one or more future dispatch dates related to the component in question (e.g., configuring a dispatch date for a replacement component prior to a predicted failure to avoid loss of data and/or resources). Additionally or alternatively, at least one embodiment can include, based at least in part on such a prediction, rendering real-time and/or ad hoc status of a given component's remaining lifespan (e.g., via at least one user interface). Such an embodiment includes modifying a prediction of a given component's lifespan information as related telemetry data and/or environment-related information changes.

Figure 4:
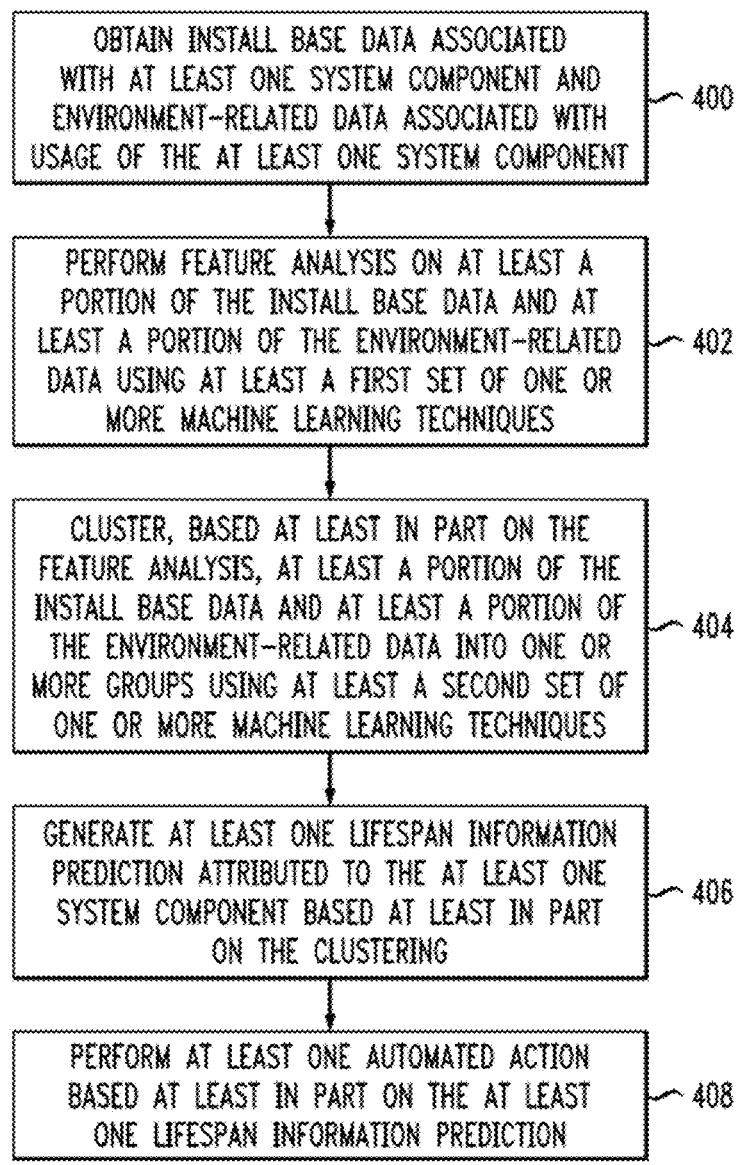
FIG. 4 is a flow diagram of a process for predicting component lifespan information by processing user install base data and environment-related data using machine learning techniques in an illustrative embodiment.

FIG. 4 is a flow diagram of a process for predicting component lifespan information by processing user install base data and environment-related data using machine learning techniques in an illustrative embodiment. It is to be understood that this particular process is only an example, and additional or alternative processes can be carried out in other embodiments.

In this embodiment, the process includes steps 400 through 408. These steps are assumed to be performed by component lifespan prediction system 105 utilizing modules 112, 114 and 116.

Step 400 includes obtaining install base data associated with at least one system component and environment-related data associated with usage of the at least one system component. In at least one embodiment, obtaining install base data associated with at least one system component includes obtaining telemetry data directed to at least one workload on the at least one system component, obtaining data pertaining to one or more threshold usage values of the at least one system component associated with at least one failure, and/or obtaining at least one manufacturer-generated average component lifespan estimate attributed to the at least one system component. Also, in one or more embodiments, obtaining environment-related data associated with usage of the at least one system component includes obtaining information identifying at least one geographical region of attributed to the at least one system component, and/or obtaining information identifying at least one manufacturing batch attributed to the at least one system component.

Step 402 includes performing feature analysis on at least a portion of the install base data and at least a portion of the environment-related data using at least a first set of one or more machine learning techniques. In at least one embodiment, performing feature analysis includes identifying one or more data features by processing the at least a portion of the install base data and the at least a portion of the environment-related data using one or more machine learning-based correlation analysis techniques and one or more machine learning-based feature interaction techniques.

Step 404 includes clustering, based at least in part on the feature analysis, at least a portion of the install base data and at least a portion of the environment-related data into one or more groups using at least a second set of one or more machine learning techniques. In one or more embodiments, clustering includes clustering the at least a portion of the install base data and the at least a portion of the environment-related data into one or more groups using one or more machine learning-based database clustering techniques.

Step 406 includes generating at least one lifespan information prediction attributed to the at least one system component based at least in part on the clustering. Step 408 includes performing at least one automated action based at least in part on the at least one lifespan information prediction. In at least one embodiment, performing the at least one automated action includes determining, based at least in part on the at least one lifespan information prediction, future demand of the at least one system component. Additionally or alternatively, performing the at least one automated action can include displaying, based at least in part on the at least one lifespan information prediction, a status indication of remaining lifespan of the at least one system component via one or more user interfaces.

The techniques depicts in FIG. 4 can also include modifying at least a portion of the at least one lifespan information prediction in response to obtaining at least one of additional install base data associated with at least one system component and additional environment-related data associated with usage of the at least one system component.

Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically predict component lifespan information by processing user install base data and environment-related data using machine learning techniques. These and other embodiments can effectively overcome problems associated with non-specific manufacturer-based average component lifespan information.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are nm on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
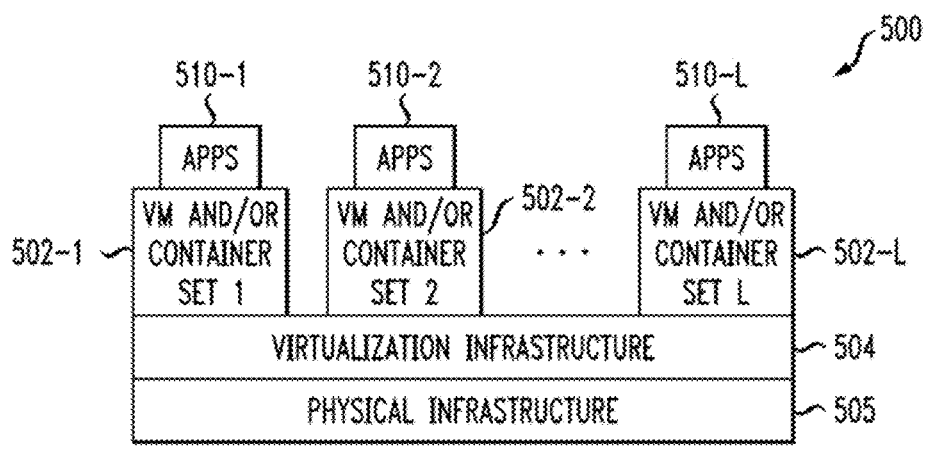
FIGS. 5 and 6 show examples of processing platforms that may be utilized to implement at least a portion of an information processing system in illustrative embodiments.
Figure 6:
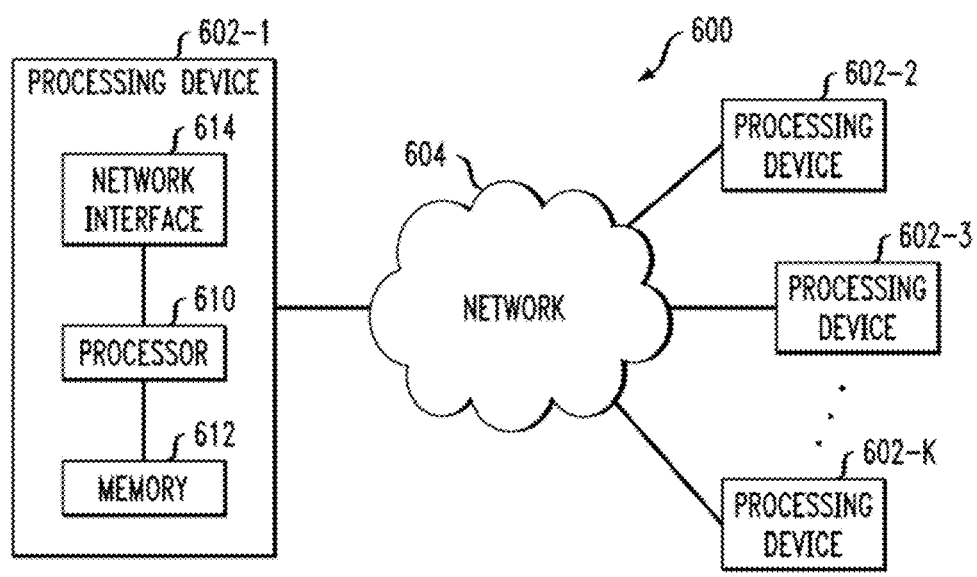

FIG. 5 shows an example processing platform comprising cloud infrastructure 500. The cloud infrastructure 500 comprises a combination of physical and virtual processing resources that are utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 comprise respective VMs, respective sets of one or more containers, or respective sets of one or more containers running in VMs. In some implementations of the FIG. 5 embodiment, the VMs/container sets 502 comprise respective VMs implemented using virtualization infrastructure 504 that comprises at least one hypervisor.

A hypervisor platform may be used to implement a hypervisor within the virtualization infrastructure 504, wherein the hypervisor platform has an associated virtual infrastructure management system. The underlying physical machines comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 comprises a microprocessor, a microcontroller, an application-specific integrated circuit (ASIC), a field-programmable gate array (FPGA) or other type of processing circuitry, as well as portions or combinations of such circuitry elements.

The memory 612 comprises random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
obtaining install base data associated with at least one system component and environment-related data associated with usage of the at least one system component;
performing feature analysis on at least a portion of the install base data and at least a portion of the environment-related data using at least a first set of one or more machine learning techniques;
clustering, based at least in part on the feature analysis, at least a portion of the install base data and at least a portion of the environment-related data into one or more groups using at least a second set of one or more machine learning techniques, wherein clustering comprises using a density-based clustering algorithm, having as parameters thereof at least one designated threshold number of data points associated with establishing at least one cluster and at least one designated distance measure associated with establishing at least one cluster, to cluster the at least one system component into the one or more groups, wherein the one or more groups comprise other instances of the at least one system component associated with (i) at least one workload intensity range at least partially overlapping with a workload intensity range attributed to the at least one system component and (ii) at least one ambient temperature range associated with a given geographic region, the at least one ambient temperature range at least partially overlapping with an ambient temperate range associated with at least one geographic region attributed to the at least one system component;

generating at least one lifespan information prediction attributed to the at least one system component based at least in part on the clustering, wherein generating at least one lifespan information prediction comprises determining at least one end-of-life value for the other instances of the at least one system component in the one or more groups, and using the at least determined one end-of-life value in generating the at least one lifespan information prediction attributed to the at least one system component; and performing at least one automated action based at least in part on the at least one lifespan information prediction, wherein performing at least one automated action comprises automatically initiating replacement of the at least one system component in accordance with the at least one lifespan information prediction;

wherein the method is performed by at least one processing device comprising a processor coupled to a memory.

2. The computer-implemented method of claim 1, wherein performing feature analysis comprises identifying one or more data features by processing the at least a portion of the install base data and the at least a portion of the environment-related data using one or more machine learning-based correlation analysis techniques and one or more machine learning-based feature interaction techniques.

3. The computer-implemented method of claim 1, wherein clustering comprises clustering the at least a portion of the install base data and the at least a portion of the environment-related data into one or more groups using one or more machine learning-based database clustering techniques.

4. The computer-implemented method of claim 1, wherein performing the at least one automated action comprises determining, based at least in part on the at least one lifespan information prediction, future demand of the at least one system component.

5. The computer-implemented method of claim 1, wherein performing the at least one automated action comprises displaying, based at least in part on the at least one lifespan information prediction, a status indication of remaining lifespan of the at least one system component via one or more user interfaces.

6. The computer-implemented method of claim 1, wherein obtaining install base data associated with at least one system component comprises obtaining telemetry data directed to at least one workload on the at least one system component.

7. The computer-implemented method of claim 1, wherein obtaining install base data associated with at least one system component comprises obtaining data pertaining to one or more threshold usage values of the at least one system component associated with at least one failure.

8. The computer-implemented method of claim 1, wherein obtaining environment-related data associated with usage of the at least one system component comprises obtaining information identifying at least one geographical region of attributed to the at least one system component.

9. The computer-implemented method of claim 1, wherein obtaining environment-related data associated with usage of the at least one system component comprises obtaining information identifying at least one manufacturing batch attributed to the at least one system component.

10. The computer-implemented method of claim 1, wherein obtaining install base data associated with at least one system component comprises obtaining at least one manufacturer-generated average component lifespan estimate attributed to the at least one system component.

11. The computer-implemented method of claim 1, further comprising:

modifying at least a portion of the at least one lifespan information prediction in response to obtaining at least one of additional install base data associated with at least one system component and additional environment-related data associated with usage of the at least one system component.

12. A non-transitory processor-readable storage medium having stored therein program code of one or more software programs, wherein the program code when executed by at least one processing device causes the at least one processing device:

to obtain install base data associated with at least one system component and environment-related data associated with usage of the at least one system component;

to perform feature analysis on at least a portion of the install base data and at least a portion of the environment-related data using at least a first set of one or more machine learning techniques;

to cluster, based at least in part on the feature analysis, at least a portion of the install base data and at least a portion of the environment-related data into one or more groups using at least a second set of one or more machine learning techniques, wherein clustering comprises using a density-based clustering algorithm, having as parameters thereof at least one designated threshold number of data points associated with establishing at least one cluster and at least one designated distance measure associated with establishing at least one cluster, to cluster the at least one system component into the one or more groups, wherein the one or more groups comprise other instances of the at least one system component associated with (i) at least one workload intensity range at least partially overlapping with a workload intensity range attributed to the at least one system component and (ii) at least one ambient temperature range associated with a given geographic region, the at least one ambient temperature range at least partially overlapping with an ambient temperate range associated with at least one geographic region attributed to the at least one system component;

to generate at least one lifespan information prediction attributed to the at least one system component based at least in part on the clustering, wherein generating at least one lifespan information prediction comprises determining at least one end-of-life value for the other instances of the at least one system component in the one or more groups, and using the at least determined one end-of-life value in generating the at least one lifespan information prediction attributed to the at least one system component; and to perform at least one automated action based at least in part on the at least one lifespan information prediction, wherein performing at least one automated action comprises automatically initiating replacement of the at least one system component in accordance with the at least one lifespan information prediction.

13. The non-transitory processor-readable storage medium of claim 12, wherein performing feature analysis comprises identifying one or more data features by processing the at least a portion of the install base data and the at least a portion of the environment-related data using one or more machine learning-based correlation analysis techniques and one or more machine learning-based feature interaction techniques.

14. The non-transitory processor-readable storage medium of claim 12, wherein clustering comprises clustering the at least a portion of the install base data and the at least a portion of the environment-related data into one or more groups using one or more machine learning-based database clustering techniques.

15. The non-transitory processor-readable storage medium of claim 12, wherein performing the at least one automated action comprises determining, based at least in part on the at least one lifespan information prediction, future demand of the at least one system component.

16. The non-transitory processor-readable storage medium of claim 12, wherein performing the at least one automated action comprises displaying, based at least in part on the at least one lifespan information prediction, a status indication of remaining lifespan of the at least one system component via one or more user interfaces.

17. An apparatus comprising:
at least one processing device comprising a processor coupled to a memory;
the at least one processing device being configured:
to obtain install base data associated with at least one system component and environment-related data associated with usage of the at least one system component;
to perform feature analysis on at least a portion of the install base data and at least a portion of the environment-related data using at least a first set of one or more machine learning techniques;
to cluster, based at least in part on the feature analysis, at least a portion of the install base data and at least a portion of the environment-related data into one or more groups using at least a second set of one or more machine learning techniques, wherein clustering comprises using a density-based clustering algorithm, having as parameters thereof at least one designated threshold number of data points associated with establishing at least one cluster and at least one designated distance measure associated with establishing at least one cluster, to cluster the at least one system component into the one or more groups, wherein the one or more groups comprise other instances of the at least one system component associated with (i) at least one workload intensity range at least partially overlapping with a workload intensity range attributed to the at least one system component and (ii) at least one ambient temperature range associated with a given geographic region, the at least one ambient temperature range at least partially overlapping with an ambient temperate range associated with at least one geographic region attributed to the at least one system component;
to generate at least one lifespan information prediction attributed to the at least one system component based at least in part on the clustering, wherein generating at least one lifespan information prediction comprises determining at least one end-of-life value for the other instances of the at least one system component in the one or more groups, and using the at least determined one end-of-life value in generating the at least one lifespan information prediction attributed to the at least one system component; and
to perform at least one automated action based at least in part on the at least one lifespan information prediction, wherein performing at least one automated action comprises automatically initiating replacement of the at least one system component in accordance with the at least one lifespan information prediction.

18. The apparatus of claim 17, wherein performing feature analysis comprises identifying one or more data features by processing the at least a portion of the install base data and the at least a portion of the environment-related data using one or more machine learning-based correlation analysis techniques and one or more machine learning-based feature interaction techniques.

19. The apparatus of claim 17, wherein clustering comprises clustering the at least a portion of the install base data and the at least a portion of the environment-related data into one or more groups using one or more machine learning-based database clustering techniques.

20. The apparatus of claim 17, wherein performing the at least one automated action comprises determining, based at least in part on the at least one lifespan information prediction, future demand of the at least one system component.

* * * * *